April 19, 1966     O. M. STUETZER     3,247,091

ELECTROHYDRODYNAMIC PRECIPITATOR

Filed Nov. 13, 1961

*INVENTOR.*
OTMAR M. STUETZER

BY Allen M. Sutton

ATTORNEY

United States Patent Office 3,247,091
Patented Apr. 19, 1966

3,247,091
ELECTROHYDRODYNAMIC PRECIPITATOR
Otmar M. Stuetzer, Hopkins, Minn., assignor, by mesne assignments, to Litton Systems, Inc., Beverly Hills, Calif., a corporation of Maryland
Filed Nov. 13, 1961, Ser. No. 151,902
13 Claims. (Cl. 204—299)

This invention relates generally to precipitators, and more particularly to an electrohydrodynamic precipitator for removing particulate matter from a liquid.

Electrostatic precipitators for removing particulate matter from gases, such as air, are known in the art. In such devices, the impurities are generally charged electrically by a corona discharge or a radioactive source, and are then attracted by an electrostatic field toward a collector electrode. Generally, the wall of the precipitator acts as the collector electrode, and the particulate matter sticks against the wall, from which it may be intermittently washed off or otherwise removed.

This principle has not been usable for particulate matter in liquids, because the liquid washes off the wall most of the material precipitated. This occurs because the viscosity and buoyancy of the liquid is usually so high that it overcomes the adhesion of the material to the wall. Therefore, in order to remove particulate matter from liquids, it has been necessary to utilize a conventional filtering apparatus in which the liquid is passed through a porous material to remove the particulate matter.

Filtering devices for liquid have several inherent disadvantages. For example, such filters ordinarily cause a drop in pressure as a result of their resistance to the flow of the liquid, which, many times, is undesirable. Also, the filter tends to clog up with the particulate matter it has removed from the liquid, thus further increasing the pressure drop as well as decreasing the efficiency of the filtering action. Furthermore, it is necessary either to clean the filter element itself periodically, or to replace the used filter with a new one.

Accordingly, it is an object of the present invention to obviate the disadvantages inherent in filters for liquids by providing an electrohydrodynamic precipitator which will efficiently remove particulate matter from either a highly resistive or a nonconducting liquid.

It is another object of the invention to provide such a precipitator which not only prevents a pressure drop in the liquid being cleaned but may be adapted to compensate and even reverse the pressure gradient along the flow path.

It is a further object to provide such apparatus whose collection efficiency does not deteriorate gradually, but remains at its initial level.

It is another object to provide an electrohydrodynamic precipitator from which the particulate matter precipitated from the liquid may be easily and quickly removed.

It is a still further object of the invention to provide a precipitator embodying no parts that require periodic cleaning or replacement other than the precipitate receiving means which may be cleaned out or replaced when full.

In accordance with one aspect of the invention, the foregoing objectives are attained in a precipitator comprising means defining a flow path for the liquid to be filtered, and precipitate receiving means communicating with the flow path. Ionizing means is located in the flow path for ionizing the particles that are to be removed from the liquid before they pass the entrance to the precipitate receiving means; particle pervious attracting electrode means, such as a ring electrode, is located adjacent the entrance to the precipitate receiving means. The ionized particles, because of the electrostatic field existing between the ionizing means and the attracting electrode means, are thrown through the particle-pervious attracting electrode means and into the receiving means where they settle to the bottom and remain. The precipitate receiving means may be periodically cleaned out or replaced, as required by the amount of material deposited therein.

Further objects and advantages will become apparent from the following description of two embodiments of the invention, taken in conjunction with the accompanying drawing, in which.

The basic principle of the precipitator of the invention includes unipolar ionization of the particulate matter, which is to be removed from the liquid. This ionized material is then attracted by and through (or past) oppositely charged electrode means and into receiving means such as a removable receptacle. The precipitator may be modified so that the movement of the ionized particles serves to carry along molecules of the liquid. Therefore, the precipitator may be incorporated in an area where the liquid is not being moved by a pump, such as on the bottom of a large storage tank, transformer casing, etc., because the precipitator provides its own circulating power.

Figure 1:
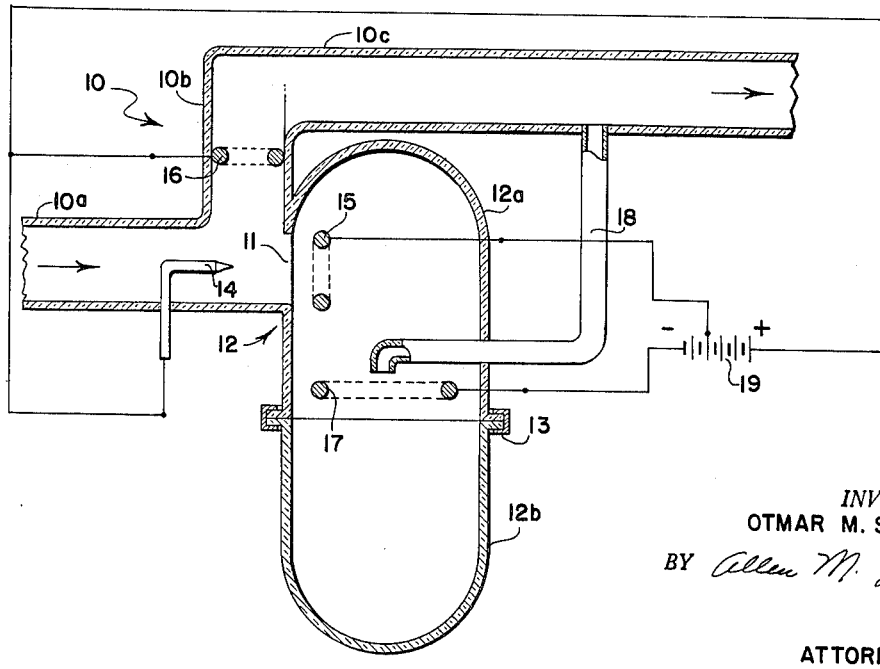
FIGURE 1 is a diagrammatic elevational view, partly in section, of one embodiment of the invention.

FIG. 1 illustrates diagrammatically a single-stage electrohydrodynamic precipitator constructed in accordance with the teachings of the invention. In that embodiment, means defining a flow path for a liquid to be filtered comprise a conduit 10 having a horizontal input portion 10a, a short vertical section 10b, and a horizontal output section 10c located at a level above that of the input portion 10a. The conduit 10 may conveniently be made of an insulating material such as glass, which has the added advantage of permitting one to observe the flow of fluid through the precipitator, although it may be made of a conducting material, if desired.

An opening 11 is provided at the juncture of the input portion 10a and the short vertical portion 10b, of the conduit, around which is secured precipitate receiving means, in this case, a receptacle 12. The receptacle 12 may conveniently be of cylindrical shape and have an upper portion 12a secured to the conduit 10 and a removable lower portion 12b. The receptacle 12 may be constructed of the same material as the conduit 10 and made integrally with the conduit, or it may be constructed of other material if desired. Glass is again desirable for use so that the precipitate may be seen and the receptacle cleaned at the proper time. The top portion 12a and the lower portion 12b are removably secured together by a conventional strap 13 which encompasses flanges formed on the bottom of the portion 12a and the top of the portion 12b. Of course, the upper and lower portions of the receptacle may be secured together by any other suitable means.

Means for ionizing the particulate matter to be removed from the liquid are provided in the present case by a pointed ionizing electrode 14 located in the flow path substantially below the vertical portion 10b of the conduit and adjacent the entrance to the receptacle 12. In the present embodiment of the invention, particle-pervious attracting electrode means comprising a ring 15 is located adjacent the opening 11 and just inside the receptacle 12. It is pointed out that the attracting electrode 15 might also be located within the conduit 10 quite close to the opening 11, and the apparatus of the invention would still function in the manner to be described. Also, ionizing means other than an electrode, such, for example, as a source of radioactivity, may be utilized to provide ionization of the particulate matter to be removed.

In order to insure that an absolute minimum of charged particulate matter is carried along the flow path in the liquid, a repelling electrode 16 may be located in the vertical portion 10b of the conduit just above and downstream of the opening 11. It may also be useful to provide an additional attracting electrode 17 inside the receptacle 12 and located a substantial distance below the attracting electrode 15.

It has been found in practice that a small bleeder line 18, connected between the inside of the receptacle 12 and the output portion 10c of the conduit is helpful in obtaining more ideal flow conditions.

Electrical potentials are provided on the various electrodes by a source indicated schematically as a battery 19. The positive side of the voltage source 19 is connected to the ionizing electrode 14 and the repelling electrode 16, while the negative side is connected to the additional attracting electrode 17 and an intermediate negative point is connected to the attracting electrode 15.

It is pointed out that the battery 19 represents a high voltage source, which may provide a potential difference between the ionizing electrode 14 and the attracting electrode 15 of as much as 15 kv. Of course, the particular potentials required on the electrodes depend upon a number of factors, such as the spacing between the electrodes, the rate of flow of liquid through the precipitator, and the size of the opening 11. In practice, it has been found that with the opening 11 having a diameter of 4 mm., and 2.5 mm. between the tip of the electrode 14 and the ring electrode 15, 14–15 kv. potential difference is required.

In operation, as the particle-laden liquid passes the ionizing electrode 14, all particles in the neighborhood of the point of the electrode larger than ions of the liquid itself acquire a substantial charge. The electrostatic field existing between the ionizing electrode 14 and the attracting electrode 15 then causes the ionized particles to be accelerated toward the attracting electrode 15. Because the attracting electrode 15 is of ring shape, the majority of the ionized particles pass through the ring and settle into the receptacle 12. In the embodiment illustrated, the ionizing electrode 14 provides positive unipolar ionization, and any of the ionized particles that tend to continue flowing along with the liquid are repelled by the positively-charged electrode 16 located in the flow path downstream from the ionizing electrode 14.

Additional means to prevent the precipitate from continuing to flow with the liquid is provided by the additional attracting electrode 17 in the receptacle 12. Because that electrode is at a more negative potential than the attracting electrode 15, it further accelerates the particles in a downward direction and aids the settling out or precipitating process.

In the precipitator illustrated in FIG. 1, the receptacle 12 is completely filled with the liquid being cleaned. This particular form is adapted for use with a liquid containing heavy impurities which will settle to the bottom of the receptacle. It is pointed out, however, that the receptacle 12 may be much longer and even extend above the level of the output portion 10c of the conduit. In that case, the receptacle would be only partially filled with liquid and the apparatus would be adapted to remove light-weight particles which might not settle completely to the bottom of the receptacle.

As shown in FIG. 1, the ionizing electrode 14 is connected to a positive potential and the attracting electrode 15 is connected to a negative potential. It has been found that with certain types of particles more efficient cleaning action may be obtained by reversing the polarities from those shown in the figure; that is, the ionizing electrode 14 may be made negative and the attracting electrode 15, positive. In that case, the polarities of the repelling electrode 16 and the additional attracting electrode 17 would be the same as those of the ionizing electrode 14 and the attracting electrode 15, respectively.

It is also pointed out that if the spacing between the tip of the ionizing electrode 14 and the attracting electrode 15 is made sufficiently small, an alternating current rather than a direct current source may be utilized. The principal advantage of such an arrangement is in the possible elimination of high-voltage rectifier circuitry which may be replaced by a simple high-voltage transformer. The preferred method of operation, however, utilizes direct potentials rather than alternating potentials on the electrodes.

Figure 2:
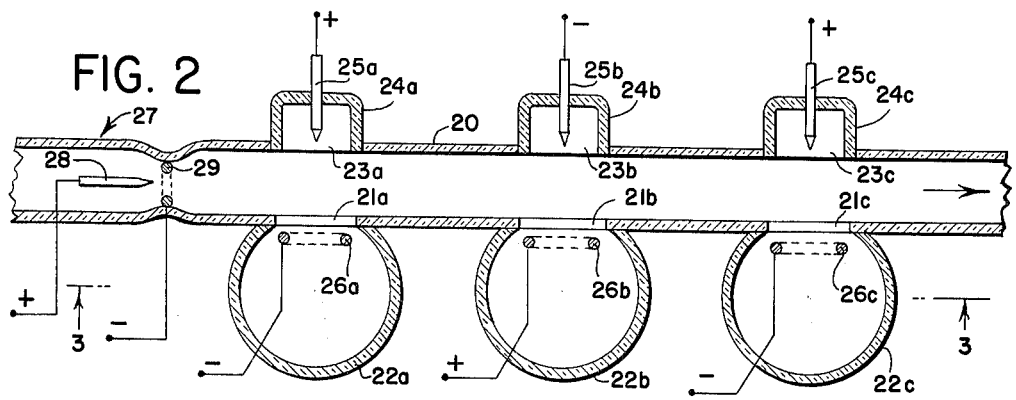
FIG. 2 is a diagrammatic view, similar to FIG. 1, but showing another embodiment of the invention in which a plurality of precipitators are cascaded.
Figure 3:
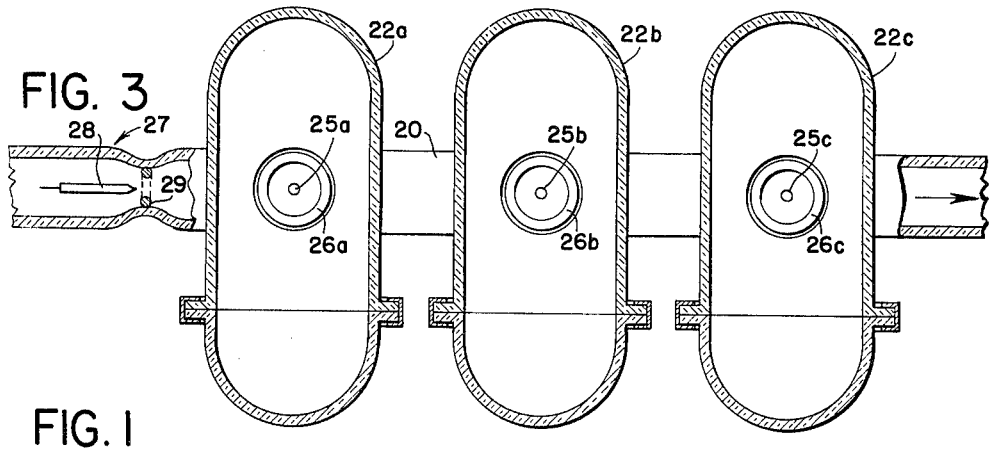
FIG. 3 is a sectional view, with parts broken away, taken on the line 3—3 of FIG. 2.

The electrohydrodynamic precipitator of the invention may be easily adapted to a cascade arrangement; that is, a plurality of precipitators may be arranged in series to provide a highly efficient filtering apparatus. Such an embodiment of the invention is illustrated in FIGS. 2 and 3. As shown in those figures, the flow path is defined by a straight conduit 20, having a plurality of axially spaced openings 21a, 21b, 21c, in its wall. Receptacles 22a, 22b and 22c, which are similar to the receptacle 12 previously discussed, are secured to the wall of the conduit around each of the openings 21a, 21b, 21c, respectively, and extending substantially at right angles to the flow path. In the wall of the conduit 20 opposite the openings 21a, 21b, 21c, are openings 23a, 23b, 23c, respectively. Each of the openings 23a, 23b, 23c is surrounded by a cup-shaped member 24a, 24b, 24c, respectively, through the end walls of which ionizing electrodes 25a, 25b, 25c, respectively, project. Attracting electrodes 26a, 26b, 26c are located adjacent corresponding openings 21, just inside the receptacles 22.

In operation, the series of precipitators shown in FIGURES 2 and 3 function in a manner similar to that of the single precipitator previously described with reference to FIG. 1. Electrical potentials of opposite polarity are provided on the ionizing electrodes 25 and the attracting electrodes 26 of each of the plurality of precipitators whereby, as the particle-laden fluid passes between the electrodes along the flow path defined by the conduit 20, the particulate matter is ionized by the electrodes 25 before it has passed the entrances to the receptacles 22. It is then attracted toward and through the attracting electrodes 26 to precipitate in the receptacles 22.

It has been found to be particularly advantageous if potentials of opposite polarity are provided on successive ionizing electrodes 25. In other words, if the ionizing electrode 25a is positive, the ionizing electrode 25b should be negative, and the ionizing electrode 25c, positive. Such an arrangement improves the efficiency of the filtering action because it has been found that some impurities seem to prefer a charge of one polarity, whereas other impurities prefer a charge of opposite polarity. Thus, if charges of both polarities are provided, virtually all of the particulate matter can be removed.

Another advantage possessed by the embodiment of the invention shown in FIGS. 2 and 3 is that it includes means for pumping the liquid that is to be cleaned. As shown, such means comprise an ion drag pump, designated generally by the numeral 27. The ion drag pump 27 comprises an ionizing electrode 28 and a collector electrode 29 to which are provided potentials of opposite polarity. Such an ion drag pump, along with its method of operation, is described in detail in copending application Serial No. 137,086, filed September 11, 1961, by Otmar M. Stuetzer and entitled Ion Drag Pump. Therefore, it is believed that it is unnecessary to describe the pump in detail herein. It is sufficient to point out that the ionizing electrode 28 injects ions into the liquid which exert drag forces on the surrounding liquid molecules, because of the attraction of the collector electrode 29, and move the molecules of the liquid along the conduit 20. If desired, a number of ion drag pumps may be provided along the conduit 20 to provide whatever pumping action is required. It is also noted that an ion drag pump may be provided in the conduit 10 of the embodiment of the invention shown in FIG. 1.

The use of an ion drag pump to propel the liquid to be cleaned through the precipitator provides an outstanding advantage, because the same voltage source that is used to energize the precipitator may also be utilized to energize the ion drag pump. Therefore, the precipitator with its own circulating means may be incorporated in an area where the liquid is not being moved by a pump, such as on the bottom of a large storage tank or transformer casing.

It is now apparent that the invention attains the objectives set forth and provides an electrohydrodynamic precipitator which efficiently removes particulate matter from liquid. Even though two embodiments of the invention have been illustrated and described, many modifications will occur to one skilled in the art which will fall within the true scope and spirit of the invention.

I claim:

1. An electrohydrodynamic precipitator comprising:
   conduit means defining a flow path for a liquid and particles to be removed from the liquid, said conduit means having an opening;
   precipitate receiving means communicating with said flow path through an entrance defined by said opening;
   ionizing means in said flow path and on one side of said entrance to said receiving means for ionizing particles to be removed from the liquid; and
   particle-pervious attracting electrode means located outside said flow path on the other side of said entrance for directing particles from the liquid through said attracting electrode means into said receiving means.

2. An electrohydrodynamic precipitator comprising:
   conduit means defining a flow path for a particle-laden liquid to be filtered, said conduit means having an opening;
   precipitate receiving means located out of said flow path and communicating with said conduit means through an entrance defined by said opening;
   ionizing electrode means received in said flow path adjacent to said entrance for ionizing particles to be removed from the liquid; and
   particle-pervious attracting electrode means located in said receiving means adjacent said entrance for directing ionized particles from the liquid through said attracting electrode means and into said receiving means.

3. The apparatus defined by claim 2 including means for providing an electric potential to said ionizing electrode means and an electric potential of opposite polarity to said attracting electrode means.

4. The apparatus defined by claim 2 wherein said attracting electrode means comprises a ring.

5. The apparatus defined by claim 2 including an ion drag pump in said flow path to advance the liquid.

6. The apparatus defined by claim 3 including electrode means in said flow path downstream of said receiving means and having an electric potential thereon of the same polarity as that on said ionizing electrode means.

7. The apparatus defined by claim 3 including additional particulate-pervious electrode means located in said receiving means and having an electric potential thereon of the same polarity as that on said attracting electrode means.

8. An electrohydrodynamic precipitator comprising:
   conduit means defining a flow path for a particle-laden liquid to be filtered, said conduit means having a plurality of openings;
   a plurality of precipitate receivers located along said conduit means and out of said flow path, each one of said receivers communicating with said conduit means through an entrance defined by one of said openings;
   ionizing electrode means in said flow path and adjacent the entrance to each of said receivers for ionizing particles to be removed from the liquid; and
   particle-pervious attracting electrode means located in each of said receivers for directing ionized particles from the liquid into each of said receivers.

9. The apparatus defined by claim 8 wherein said precipitate receivers are arranged substantially at right angles to said flow path.

10. The apparatus defined by claim 8 wherein the ionizing electrode means and the attracting electrode means adjacent each precipitate receiver are of opposite polarity.

11. The apparatus defined by claim 10 wherein successive ionizing electrode means in the direction of flow are of opposite polarity.

12. A precipitation type apparatus for removing extraneous material from liquid comprising:
   conduit means defining a principal flow path for the liquid;
   means separate from said conduit means for receiving the extraneous material, said means being out of the principal flow path, but communicating with it through an opening; and
   means for ionizing particles of the extraneous material in said flow path and for providing an electric field gradient across said opening to exert an electrical force on the ionized particles to urge them from the principal flow path into the material-receiving means.

13. A combination as defined in claim 12 wherein the means for providing a potential gradient includes at least one electrode which is located wholly outside of said principal flow path.

References Cited by the Examiner
UNITED STATES PATENTS

| | | | |
|---|---|---|---|
| 2,077,505 | 4/1937 | Woelflin | 204—184 |
| 2,100,155 | 11/1937 | Beron | 55—154 |
| 2,116,509 | 5/1938 | Cottrell | 204—302 |
| 2,698,669 | 1/1955 | Wintermute | 55—138 |
| 3,129,157 | 4/1964 | Loeckenoff | 204—299 |

JOHN H. MACK, *Primary Examiner.*

MURRAY A. TILLMAN, JOHN R. SPECK, *Examiners.*